United States Patent [19]

Kitamoto et al.

[11] 4,409,281

[45] Oct. 11, 1983

[54] MAGNETIC RECORDING MEDIUM

[75] Inventors: Tatsuji Kitamoto; Goro Akashi, both of Odawara, Japan

[73] Assignee: Fuji Photo Film Co., Ltd., Kanagawa, Japan

[21] Appl. No.: 255,133

[22] Filed: Apr. 17, 1981

[30] Foreign Application Priority Data

Apr. 21, 1980 [JP] Japan .................................. 55-52740

[51] Int. Cl.$^3$ ............................ G11B 5/70; B32B 7/02
[52] U.S. Cl. .................................. 428/212; 252/62.54; 360/134; 360/135; 360/136; 427/131; 427/132; 427/128; 428/336; 428/694; 428/695; 428/900
[58] Field of Search ....................... 427/131, 128, 132; 428/694, 695, 900, 611, 928, 212, 336; 360/134–136; 252/62.54

[56] References Cited

U.S. PATENT DOCUMENTS

| | | | |
|---|---|---|---|
| 3,761,311 | 9/1973 | Perrington | 428/694 |
| 4,172,171 | 10/1979 | Suzuki et al. | 427/131 |
| 4,210,946 | 7/1980 | Iwasaki et al. | 428/900 |
| 4,323,621 | 4/1982 | Kober | 428/694 |

FOREIGN PATENT DOCUMENTS

| | | | |
|---|---|---|---|
| 2507975 | 9/1975 | Fed. Rep. of Germany | 427/131 |
| 2615961 | 10/1976 | Fed. Rep. of Germany | 427/131 |
| 52-6509 | 5/1977 | Japan | 427/131 |
| 55-84043 | 6/1980 | Japan | 427/131 |
| 56-34145 | 4/1981 | Japan | 428/900 |
| 1427731 | 3/1976 | United Kingdom | 427/128 |

*Primary Examiner*—Ellis P. Robinson
*Attorney, Agent, or Firm*—Sughrue, Mion, Zinn, Macpeak and Seas

[57] ABSTRACT

A magnetic recording medium is described comprising a first layer comprising a magnetic iron oxide powder dispersed in a binder formed on a nonmagnetic support, a second layer formed on the first layer comprising a ferromagnetic metal powder dispersed in a binder, and having a greater coercive force than the first layer, and a third layer comprising a thin ferromagnetic metal film formed on the second layer in a thickness of from $0.01\mu$ to $0.5\mu$.

4 Claims, No Drawings

MAGNETIC RECORDING MEDIUM

BACKGROUND OF THE INVENTION

This invention relates to a magnetic recording medium, and more particularly, to a magnetic recording medium capable of achieving high-density recording and having good mechanical properties.

Magnetic recording is a technique that achieves high-density magnetic recording, and repeated recording and reproduction is possible with this technique. Because of this, the magnetic recording technique is employed in recording many kinds of signals, including audio signals, video signals, and digital signals. In view of the desirable features of magnetic recording, sales of audio tape and video tape for miniaturized video tape recorders (VTRs) for for home- and office-use have greatly expanded, and their quality has also improved greatly.

To record video signals at a rate of 30 frames per second, which is the standard signal rate for television, a very large signal unit of from 1 to 10 MHz per second must be recorded in the form of a difference in magnetization on magnetic tape. One of the most important targets in efforts to improve the quality of magnetic tape is to make the minimum recording unit on magnetic tape as small as possible; in other words to get the highest possible recording density per unit length on the magnetic tape because this directly enables the use of small-sized magnetic tape, and hence miniaturized video taper recorder.

In recording with a ring-shaped magnetic head of the type most commonly used in magnetic recording, the distribution of magnetizing force in front of the magnetic head gap decreases generally in proportion to the distance from the head face. Accordingly, the larger the distance from the head face, the smaller the magnetizing force acting on the magnetic tape.

If $\lambda$ is the recording wavelength (i.e., the head to magnetic tape speed divided by the frequency of the signal recorded), d is the distance between a certain point in the magnetic layer of a magnetic tape and the surface of that layer, and a is the gap between the head face and the surface of the magnetic layer of the magnetic tape, the output of the signal reproduced decreases at a rate of $55.5 (d+a)/(\lambda)$ decibels (dB). Therefore, if the recording wavelength is small, the reproduction output decreases rapidly even if the value of $d+a$ is small. If the recording wavelength $\lambda$ becomes less than 1 to $2\mu$ and less than the thickness of the magnetic layer $d_o$ (which is generally 3 to $12\mu$), magnetization in the part of the magnetic tape remote from the head does not effectively contribute to reproduction output. When $\lambda$ is greater than 10 to $100\mu$ and is adequately larger than the thickness of the magnetic layer $d_o$, the magnetization of every part of the magnetic layer contributes to the reproduction output.

A method has been developed to provide video tape or other magnetic tape that is capable of high-density recording, comprising increasing the coercive force of the magnetic layer to a level high enough to overcome the demagnetizing field created by self-demagnetization from high recording density. Chrome dioxide, Co-modified iron oxide, and finely divided iron alloys are examples being used commercially. The self-demagnetizing effect can be reduced by decreasing the thickness of the magnetic layer for a given recording density on the magnetic tape, and on the basis of this idea, plating or vapor deposition of Co alloy have been proposed as a technique for high density magnetic recording.

These techniques primarily contribute to the output produced in high recording density for $d_o/\lambda \geqq 1$. With video tape for use in VHS (Video Home System, a video recording/reproducing system of Japan Victor Co.) or Beta-format system (a video recording/reproducing system of Sony Co.), color signals and audio signals are recorded in relatively low density ($d_o/\lambda >>1$). To provide adequate reproduction output in such low recording density, a magnetic layer as thick as from about 3 to $6\mu$ is used. The strength of the recording magnetic field decreases rapidly as the distance from the surface of the recording magnetic head increases. This strength of the recording magnetic field decreases generally in proportion to $(d+a)/g$ where "g" is gap width of the head. Typical gap lengthes are as follows. The head gap width g is from 4 to $1.5\mu$ for audio recording head, from 2 to $1\mu$ for an audio record-/reproduce head, and from 1 to $0.4\mu$ for video head. Therefore, many methods have been proposed to provide high reproduction output in low as well as high recording density ($1<<<d_o/\lambda - d_o/\lambda >>1$) for a particularly small head gap ($d_o/g>1$) by decreasing the coercive force continuously or stepwise from the surface to the bottom of the magnetic layer. Such methods have been described, for example, in U.S. Pat. Nos. 2,691,072, 2,643,130, 2,647,954, and 3,761,311. An arrangement wherein a magnetic layer made of an iron alloy having a relatively large coercive force is formed on a magnetic layer made of iron oxide (having a relatively small coercive force) is also proposed in Japanese Patent Publication No. 2218/62.

However, because of the size of the magnetic particles used and the application technique available, it is very difficult to coat these prior art magnetic recording media with a thin (less than $0.5\mu$) uniform layer of overcoating wherein an iron alloy powder having high coercive force and capable of producing high output in high recording density is dispersed in a binder. In addition, in view of the recent trend of using a small head gap, e.g., as small as from 2 to $0.3\mu$, an even thinner topcoat is required, and this makes it even more difficult to achieve high recording density and provide adequate reproduction output by the above prior art.

SUMMARY OF THE INVENTION

Therefore, the primary object of this invention is to provide a magnetic recording medium free from the defects of conventional magnetic recording mediums, and which has good mechanical properties.

It has now been found that the objects of this invention can be achieved by a magnetic recording medium comprising a first layer comprising a magnetic iron oxide powder dispersed in a binder formed on a nonmagnetic support, a second layer formed on the first layer comprising a ferromagnetic metal powder dispersed in a binder and having a greater coercive force than that of the first layer, and a third layer comprising a thin ferromagnetic metal film being formed on the second layer, by plating or vapor deposition, preferably by vapor deposition, in a thickness of from 0.01 to 0.5 $\mu$m.

The nature of this invention is further exemplified by the embodiment of a magnetic recording medium according to this invention described in detail below.

DETAILED DESCRIPTION OF THE INVENTION

To prepare a magnetic recording medium according to this invention, first and second magnetic layers are formed on the surface of a nonmagnetic flexible support by applying dispersions of finely-divided (i.e., powdered) ferromagnetic materials in organic binders, and, before or after drying, forming a thin ferromagnetic metal film on the second magnetic layer.

The first and second magnetic layers can be formed by using a support, finely divided ferromagnetic material, organic binder, other additives, and a coating technique as described in Japanese patent application (OPI) No. 102804/77 (the term "OPI" as used herein means an unexamined published Japanese patent application) or U.S. Pat. No. 4,135,016. In a sequential coating technique, the respective layers are formed sequentially on the nonmagnetic support, and each surface is made smooth after coating using a calendering machine. In a simultaneous technique using an extruder, the surface of the upper coat (i.e., the second magnetic layer) is made smooth using a calendering machine.

The finely divided ferromagnetic material used in the first magnetic layer has a coercive force in the range of from 200 to 700 oersteds, and the finely divided ferromagnetic material used in the second magnetic layer has a higher coercive force than that of the first layer and in the range of from 600 to 1,300 oersteds. These range of the coercive forces may be extended somewhat, depending on the characteristics of the recorder, including the head, and the thickness of the second magnetic layer.

A thin ferromagnetic metal film can be formed on the surface of the second magnetic layer as the third layer by vacuum deposition, plating, ion plating, vapor deposition, or any other suitable means known for forming a thin metal layer. Examples of the ferromagnetic metal according to this invention include metals such as Co, Fe and Ni, and alloys such as Co-Ni, Co-Fe, Co-V, Co-Y, Co-Si, Co-Mn, Co-Fe-Ni, Co-R, wherein R is a rare-earth element such as Co-La, Co-Ce, Co-Pr, Co-Sm, Co-B, Co-Ni-B, Co-Ni-Ag, Co-Ni-Re, Co-Mn-P, Co-Zn-P, Co-Pb-P, Co-Sm-Cu, Co-Ni-Fe-B, Fe-B, Fe-Ni, Fe-Rh, Fe-V, Co-P, Co-Ni-P, Co-Fe-P, Co-Ni-Fe-P, Co-Ni-Mn-P, Co-Ni-N, Co-N, Fe-N and Co-Fe-N. The thin ferromagnetic film may be formed by methods such as those described in Japanese Patent Publication Nos. 5301/66, 20386/66, 23892/68, 1126/69, 6309/69, 9490/69, 15507/69, 18038/72, and 33161/73, Japanese Patent Application Nos. 14326/74, 45703/74 and 57396/74, and Japanese Patent Application (OPI) Nos. 15999/74, 75004/75, 115507/75, 116330/75, 75005/75, 123304/75, 33806 to 33812/75, 115508/75, 119609/75 and 149008/76. In consideration of uniformity of film thickness and contribution to reproduction output, it is desired that the ferromagnetic metal film be formed in a thickness of from more than $0.01\mu$ to less than $0.5\mu$, and have a coercive force greater than 400 oersteds. The oblique vapor deposition technique is particularly effective for providing a thin film having a high coercive force. Such technique is disclosed, for example, in U.S. Pat. Nos. 3,342,632 and 3,342,633.

As described above, the magnetic recording medium of this invention comprises a nonmagnetic support coated with first and second magnetic layers which have a very thin third magnetic layer formed thereon by vapor deposition or any other suitable method. Because of this arrangement, the object of this invention to produce high reproduction output in high recording density for a small head gap width g is satisfactorily achieved.

The novel advantages of the recording medium of this invention are made clearer by reference to the following example and comparative example, which are given here for illustrative purposes only, and are not intended to limit the scope of the invention. All parts are by weight unless otherwise indicated.

EXAMPLE

Coating solutions of ferromagnetic materials A and B were prepared in the manner described below.

Coating solution A

A hundred parts by weight of iron oxide containing 2 wt% Co, having a coercive force of 660 oersteds and comprising acicular particles ca. $0.5\mu$ long and ca. $0.05\mu$ wide was uniformly mixed in a ball mill with the following composition for 24 hours:

| | |
|---|---|
| Vinylidene chloride resin (vinyl chloride/vinylidene chloride = 87/13 mol %, degree of polymerization = 400) | 20 parts |
| Polyester polyurethane (m.w. = ca. 30,000, reaction product of diphenylmethane diisocyanate and polyester composed of adipic acid, diethylene glycol and butanediol) | 10 parts |
| Dibutyl phthalate | 2 parts |
| Lecithin | 2 parts |
| Butyl acetate | 250 parts |

To the mixture, 3 parts of a triisocyanate compound (in the form of a 75 wt% ethyl acetate solution of a reaction product comprising 3 mols of toluene diisocyanate and 1 mol of trimethylpropane, available under the trade name Desmodur L-75 from Bayer AG) was added, and the resulting mixture was further agitated in the ball mill for 30 minutes to form a uniform dispersion.

Coating solution B

A hundred parts by weight of iron powder (about 90% of which was metallic iron, and about 10% is stabilized iron oxide on the surface of metallic iron) which had a coercive force of 950 oersteds and comprised acicular particles about $0.3\mu$ long and about $0.04\mu$ wide was uniformly mixed in a ball mill with the following composition for 24 hours:

| | |
|---|---|
| Vinylidene chloride resin (vinyl chloride/vinylidene chloride = 87/13 mol %, degree of polymerization = 400) | 12 parts |
| Acrylic ester/acrylonitrile copolymer (6:4 molar ratio) | 7 parts |
| Dibutyl phthalate | 1 part |
| Lecithin | 1.5 parts |
| Carbon black (av. particle size = 40 $\mu$m) | 0.5 part |
| Butyl acetate | 250 parts |

Coating solution A was applied onto a polyester film ($12\mu$ thick on dry basis) by doctor knife coating in a thickness of $3.5\mu$, and, after drying, the resulting coating was calendered to provide a smooth surface. Then, the coating solution B was applied to the first layer in a dry thickness of $1.4\mu$ by doctor knife coating, and after drying, the resulting coating was calendered to provide a smooth surface.

A cobalt film having a dry thickness of 0.2μ was formed on the second coating by oblique vapor deposition. In a bell jar (2×10⁻⁵ Torr.) Co was heated and vaporized with 270° deflected electron beams (Model JEBG 2030A available from JEOL Ltd., Japan) and part of the Co vapor stream was interrupted by a masking plate so that only a stream having an angle of incidence of greater than 75° deposited on the second coating. The Co film had a coercive force of 1100 oersteds. Then additional magnetic tape samples were prepared in the same way but by varying the thickness of the Co film in the range of from 0.005 to 0.5μ, as indicated in Table 1.

Using a VHS video tape recorder (Model NV-8700 of Matsushita Electric Industrial Co., Ltd., Japan) that was retrofitted to reduce the rotating speed of the head drum by one half (i.e., head-to-tape speed=2.9 meter/sec.), and which had a ferrite magnetic head with a gap width of 0.3μ, signals were recorded on one of the tape samples (Sample 8) at 2.9 MHz ($\lambda=1\mu$) and on seven samples (Samples 1-7) at 5.8 MHz ($\lambda=0.5\mu$). The electric recording current was controlled so that each tape sample produced a maximum reproduce output.

The remaining two tape samples (Sample Nos. 9 and 10) were run on a cassette tape recorder (Model 680ZX of Nakamichi Co., Ltd.) at a speed of 2.38 cm/sec. for recording signals on one tape (Sample 10) at 333 Hz ($\lambda=7.9\mu$) and on the other tape (Sample 9) at 5 KHz ($\lambda=0.6\mu$). 5% distorted output was measured and for 333 Hz saturated output was measured for 5 KHz.

COMPARATIVE EXAMPLE P Four comparative magnetic tape samples were prepared by repeating the procedure of Example, except that they did not include a third layer made of a thin vapor-deposited ferromagnetic metal film. Comparative Sample Nos. 1, 2, 3, and 4 were subjected to the same record and reproduce tests as in Sample Nos. 7 to 10, respectively.

The results are shown in Table 1. The output for Sample Nos. 1 to 10 was shown relative to the corresponding evaluation condition in Comparative Sample Nos. 1 to 4.

TABLE 1

| | Thickness of Third Magnetic Layer (μ) | λ (μ) | Difference in Reproduce Output (dB) Difference from Comparative Samples in Output at the Same λ Value |
|---|---|---|---|
| Sample No. | | | |
| 01 | 0.005 | 0.5 | +0.3 |
| 02 | 0.01 | 0.5 | +0.6 |
| 03 | 0.02 | 0.5 | +1.5 |
| 04 | 0.05 | 0.5 | +2.5 |
| 05 | 0.10 | 0.5 | +3.0 |
| 06 | 0.50 | 0.5 | +2.0 |
| 07 | 0.20 | 0.5 | +4.0 |
| 08 | 0.20 | 1.0 | +3.0 |
| 09 | 0.20 | 0.6 | +1.0 |
| 10 | 0.20 | 7.9 | +2.0 |
| Comparative Sample No. | | | |
| 01 | no third layer | 0.5 | 0 |
| 02 | no third layer | 1.0 | 0 |
| 03 | no third layer | 0.6 | 0 |
| 04 | no third layer | 7.9 | 0 |

As is clear from Table 1, Samples Nos. 1 to 10, having a vapor-deposited Co film as the third layer produced higher reproduce output than Comparative Sample Nos. 1 to 4 having no such third layer, and Sample Nos. 3 to 10, wherein the thickness of the third layer was greater than 0.01μ provided appreciably high reproduce output as compared with Samples Nos. 1 and 2 wherein the thickness was not greater than 0.01μ. Furthermore, a third layer whose thickness is 0.01μ or less throughout is difficult to obtain, and a third layer having a thickness greater than 0.5μ is also not practical, because the underlying support has a tendency to curl due to the effect of heat, and it takes excessive time to form such layer by vapor deposition.

While the invention has been described in detail and with reference to specific embodiments thereof, it will be apparent to one skilled in the art that various changes and modifications can be made therein without departing from the spirit and scope thereof.

What is claimed is:

1. A magnetic recording recording medium comprising a first layer comprised in a magnetic iron oxide powder dispersed in a binder formed on a non-magnetic support having a coercive force of from 200 to 700 oersteds, a second layer formed on the first layer comprising a ferromagnetic metal powder dispersed in a binder and having a greater coercive force than that of the first layer of from 600 to 1300 oersteds, and a third layer comprising a thin ferromagnetic metal film formed on the second layer in a thickness of from 0.01μ to 0.5μ and having a coercive force greater than 400 oersteds.

2. A magnetic recording medium as in claim 1 wherein said third layer is formed by vapor deposition.

3. A magnetic recording medium as in claim 1 wherein said third layer is formed by plating, ion plating, or vapor deposition.

4. A magnetic recording medium as in claim 1, 2, or 3, wherein the third layer comprises a thin ferromagnetic metal film selected from group consisting of Co, Fe, Ni, Co-Ni, Co-Fe, Co-V, Co-Y, Co-Si, Co-Mn, Co-Fe-Ni, Co-R, wherein R is a rare-earth element, Co-B, Co-Ni-B, Co-Ni-Ag, Co-Ni-Re, Co-Mn-P, Co-Zn-P, Co-Pb-P, Co-Sm-Cu, Co-Ni-Fe-B, Fe-B, Fe-Ni, Fe-Rh, Fe-V, Co-P, Co-Ni-P, Co-Fe-P, Co-Ni-Fe-P, Co-Ni-Mn-P, Co-N, Co-Ni-N, Fe-N and Co-Fe-N.

* * * * *